US009246779B2

(12) United States Patent
Ady et al.

(10) Patent No.: US 9,246,779 B2
(45) Date of Patent: Jan. 26, 2016

(54) METHOD AND APPARATUS FOR ENHANCED NETWORK DATA PROCESSING AND CUSTOMIZABLE USER INTERFACE (75) Inventors: Earle W. Ady, Atlanta, GA (US); Justin T. Altman, Loganville, GA (US); Matt Culbreth, Marietta, GA (US); John Herren, Atlanta, GA (US); David M. Nichols, Decatur, GA (US); Jason Trost, Atlanta, GA (US)

(73) Assignee: Endgame Systems, Inc., Atlanta, GA (US)

( * ) Notice: Subject to any disclaimer, the term of this patent is extended or adjusted under 35 U.S.C. 154(b) by 266 days.

(21) Appl. No.: 13/593,160

(22) Filed: Aug. 23, 2012

(65) Prior Publication Data
US 2014/0059433 A1 Feb. 27, 2014

(51) Int. Cl.
*G06F 15/16* (2006.01)
*H04L 12/26* (2006.01)
*H04L 29/06* (2006.01)
*H04L 29/12* (2006.01)

(52) U.S. Cl.
CPC .......... *H04L 43/045* (2013.01); *H04L 63/1408* (2013.01); *H04L 61/1511* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 7,849,502 B1 * | 12/2010 | Bloch et al. | 726/11 |
| 8,347,394 B1 * | 1/2013 | Lee | 726/25 |
| 2001/0047404 A1 * | 11/2001 | Suda | 709/223 |
| 2008/0184357 A1 * | 7/2008 | Drako et al. | 726/11 |
| 2008/0256210 A1 * | 10/2008 | Malik | 709/206 |
| 2009/0307753 A1 * | 12/2009 | Dupont et al. | 726/3 |
| 2011/0153681 A1 * | 6/2011 | Peng | 707/803 |
| 2011/0225647 A1 * | 9/2011 | Dilley et al. | 726/14 |
| 2012/0102169 A1 * | 4/2012 | Yu et al. | 709/223 |
| 2013/0191499 A1 * | 7/2013 | Ludin et al. | 709/217 |
| 2013/0311478 A1 * | 11/2013 | Frett et al. | 707/741 |

OTHER PUBLICATIONS

PCT International Search Report of PCT/US13/55229; dated May 12, 2014 (4 pgs.).
PCT Written Opinion of the International Searching Authority of PCT/US13/55229; dated May 12, 2014 (5 pgs.).

* cited by examiner

*Primary Examiner* — Karen Tang
(74) *Attorney, Agent, or Firm* — DLA Piper LLP (US)

(57) ABSTRACT

A method and system for processing network data and displaying the results using a customizable user interface are disclosed.

15 Claims, 9 Drawing Sheets

METHOD AND APPARATUS FOR ENHANCED NETWORK DATA PROCESSING AND CUSTOMIZABLE USER INTERFACE

An improved method and apparatus for processing network data and displaying the results using a customizable user interface are disclosed.

BACKGROUND OF THE INVENTION

The amount of network traffic on the Internet continues to escalate. At the same time, the number of potential security and data integrity threats, such as malware, also continue to escalate. It is becoming increasingly difficult to track the prevalence and spread of these threats due to the overwhelming amount of network traffic.

What is needed is an improved method and apparatus for collecting and analyzing network traffic to identify potential threats. What is further needed is the ability to filter and/or aggregate the collected data to identify patterns that indicate the presence of potential threats.

Equally important to data collection and analysis is having a "frontend" user interface that allows a user to quickly understand the data and identify patterns in the data. It is important to allow a user select the type of data of interest and to present the relevant data to the user in a way that a human being can quickly understand. In the prior art, user interfaces would allow a user to filter data by selected criteria. However, prior art user interfaces were limited because the criteria were not updated in real-time as the underlying dataset itself evolved.

What is needed is an improved user interface that permits a user to customize the user interface to be able to select the data of interest. What is further needed is a user interface that is modified in real-time as the underlying data set changes.

SUMMARY OF THE INVENTION

The aforementioned problems and needs are addressed by a computing device for collecting, filtering, and aggregating network data and displaying the results utilizing a customizable user interface.

DETAILED DESCRIPTION OF THE PREFERRED EMBODIMENTS

Data Collection, Aggregation, and Filtering

Figure 1:
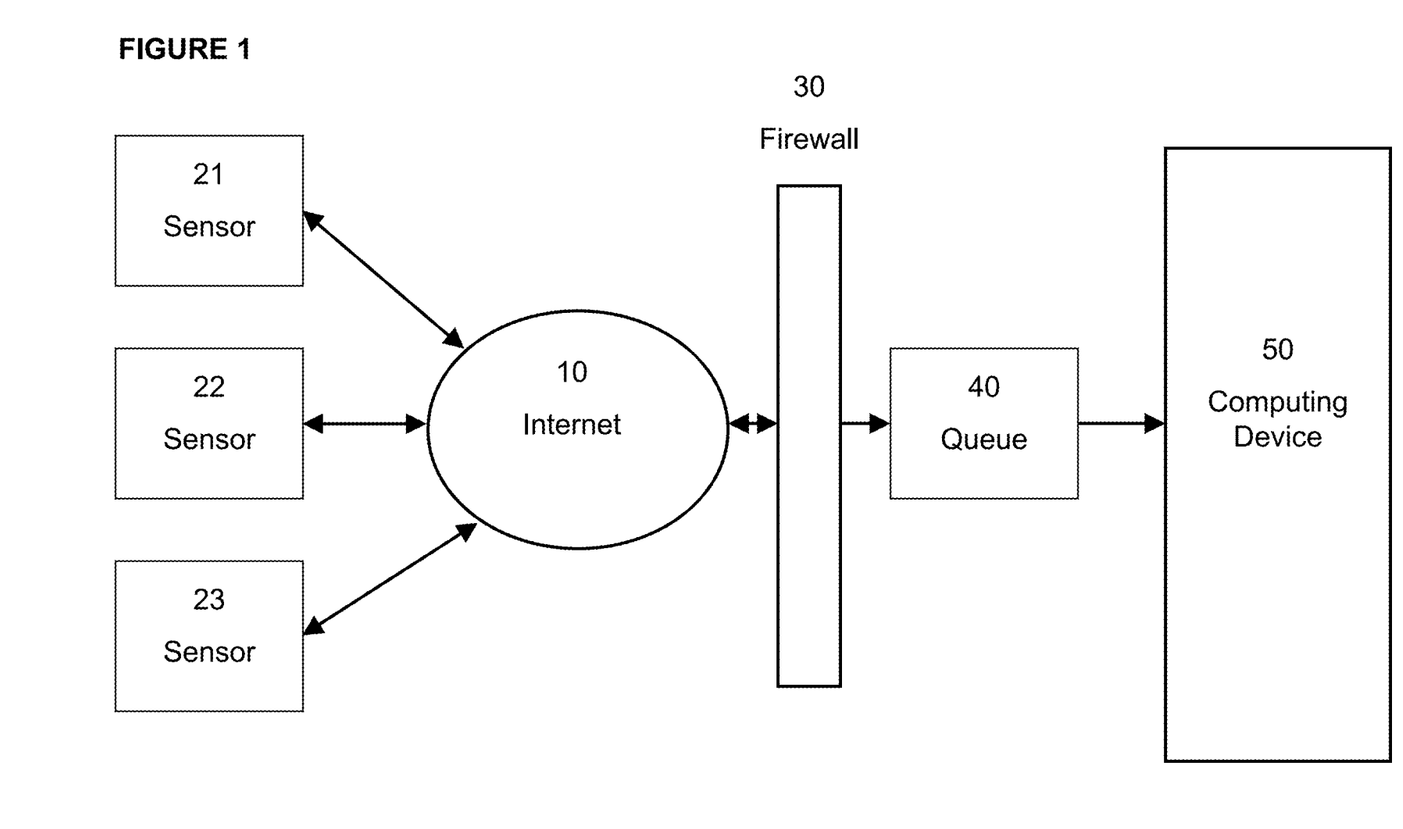
FIG. 1 is an exemplary block diagram of a computing device that collects data from sensors over a network.

An embodiment is now described with reference to FIG. 1. Exemplary sensors 21, 22, and 23 are coupled to the Internet 10. Sensors 21, 22, and 23 each are well-known network traffic collection devices that "sit" on the Internet or a local network and gather data.

Figure 2:
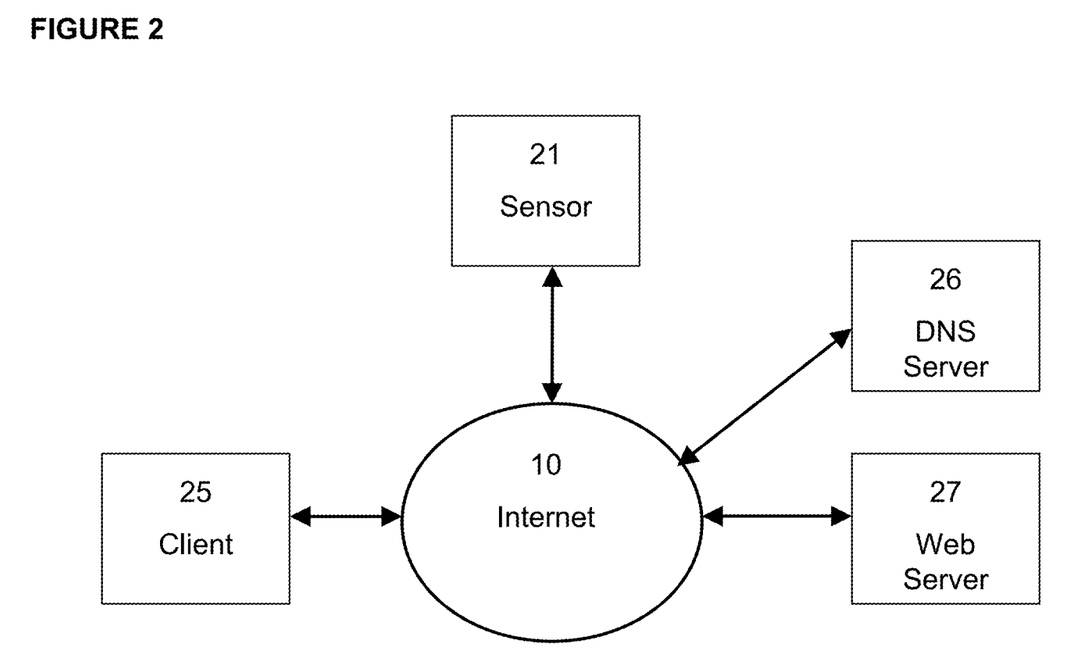
FIG. 2 is an exemplary block diagram of an embodiment of a sensor that collects data over a network.

Further description will now be provided for exemplary sensor 21. It will be understood by one of ordinary skill in the art that the same description applies to sensor 22, sensor 23, and other sensors not shown. With reference now to FIG. 2, in this embodiment, sensor 21 monitors Domain Name Service (DNS) lookup activity, as would occur when client computer 25 attempts to access a website over the Internet 10. Typically, the user of client computer 25 will type a URL (or web site address) into a web browser on client computer 25. Client computer 25 then will initiate a DNS lookup by contacting DNS server 26, either directly or through an Internet Service Provider or other server (not shown). DNS server 26 will provide client computer 25 with the IP address for the server that hosts the requested URL, in this example, web server 27.

Sensor 21 identifies the DNS lookup event initiated by client computer 25, and it creates a record for the DNS lookup event and optionally can store all or portions of the communication that follows between client computer 25 and web server 27. The record can include the DNS information, the IP address of client computer 25, the IP address of web server 27, a timestamp for all communications, and optionally, the messages (such as HTTP messages) that are transmitted between client computer 25 and web server 27 during the web session.

With reference again to FIG. 1, periodically, sensor 21 will send all or some of the collected data to computing device 50. Computing device 50 is coupled to the Internet 10 through firewall 30. Firewall 30 comprises any known hardware and/or software firewall device. Firewall 30 protects the security and integrity of computing device 50. Sensor 21 can organize and send the data using known data formats, such as an XML file. The data optionally first enters queue 40, where the data can be further organized and/or filtered before sending it to computing device 50.

Figure 3:
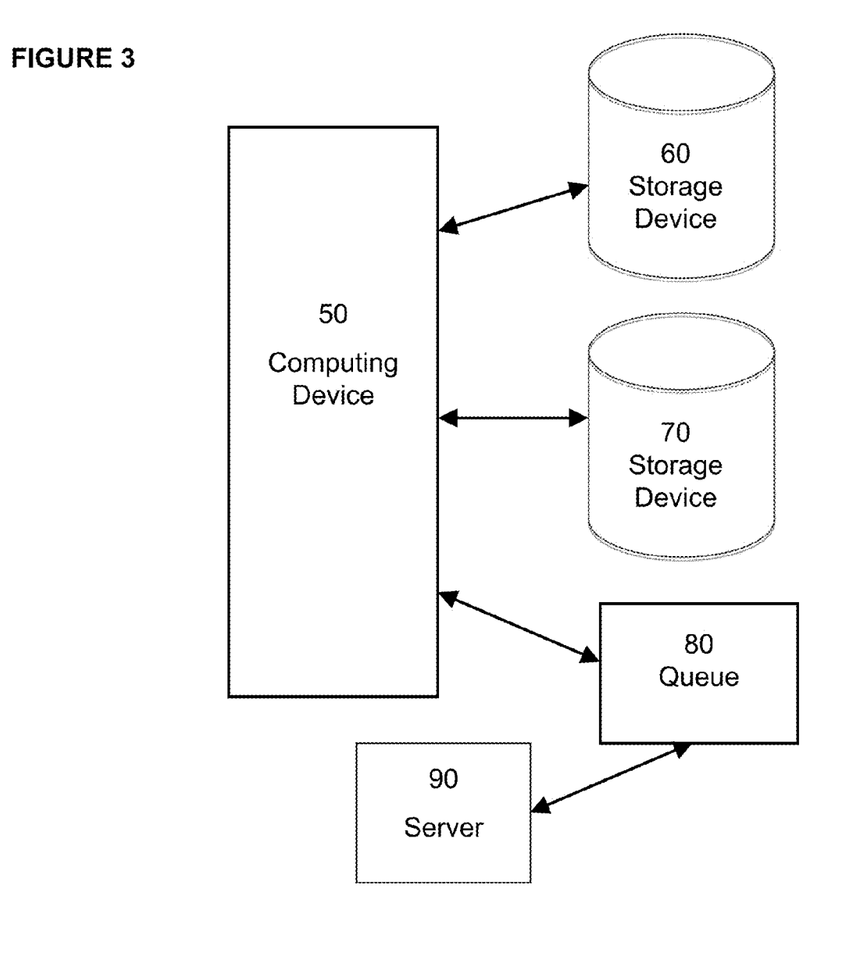
FIG. 3 is an exemplary block diagram of other devices used in conjunction with the computing device to analyze data collected over a network.

With reference now to FIG. 3, computing device 50 is coupled to storage device 60 and storage device 70. Optionally, storage device 60 can be configured as long-term storage and can comprise hard disk drives, optical drives, tape drives, flash devices, or any other storage medium. Optionally, storage device 70 can be configured as short-term storage and can comprise flash devices, RAM, or other quickly-accessible storage. Computing device 50 optionally can run a database application, such as MySQL, and can store the data in storage device 70 and/or storage device 60.

Figure 4:
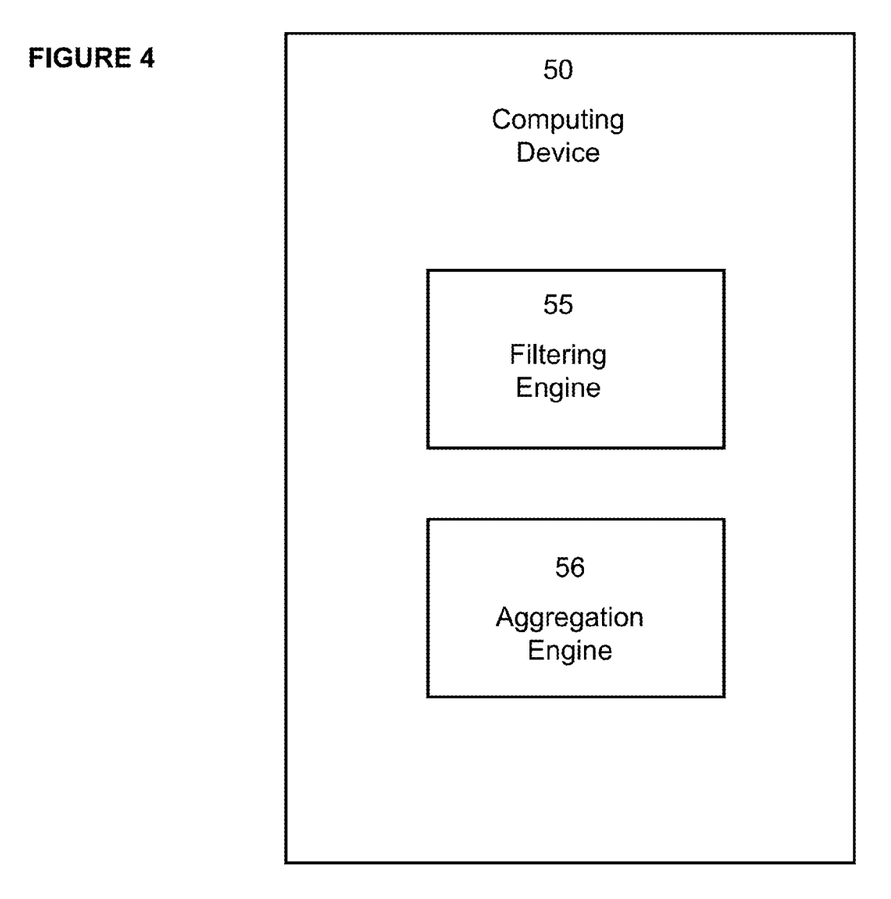
FIG. 4 is an exemplary block diagram of a filtering engine and aggregation engine within a computing device.

With reference now to FIG. 4, additional detail is provided regarding computing device 50. Computing device 50 optionally comprises filtering engine 55 and aggregation engine 56, each of which comprises software code executed by computing device 50. Computing device 50 potentially will receive Terabytes (or more) of data from sensor 21 and other sensors and will store that data in storage device 70. Filtering engine 55 will filter out (and potentially delete) all data that is not of interest. For example, it can filter out all IP addresses that are not of interest. This can be performed on a geographic basis, since IP addresses can be correlated with geography (by country or even by latitude-longitude coordinates) using services such as those offered by Akamai. So for example, if the data of interest is network activity in Canada, filtering engine 55 can filter out all data that is not associated with an IP address in Canada. Filtering engine 55 can perform filtering based on any available fields, including IP address, owner of IP address, geography, frequency of DNS lookup of an IP address, frequency of web communications involving an IP address, or key words within the network traffic (such as words often used in Internet scams, such as "prince"). In this manner, filtering engine 55 can substantially reduce the set of data stored in storage device 70.

Aggregation engine 56 can provide additional data related to the data received by computing device 50 or that is output by filtering engine 55. For example, aggregation engine 56 can perform calculations, such as number of accesses to an IP address within a certain amount of time, minimum number of hits to an IP address, maximum number of hits to an IP address within a certain time period, the longest or shortest duration of a web session, or number of hits within the past X seconds.

It will be understood that filtering engine 55 and aggregation engine 56 can be used in a customizable manner to distill data that is of interest to a customer of the operator of computing device 50. For example, if the customer is interested in all accesses to an IP address associated with malware by IP addresses associated with the customer's network, then filtering engine 55 and aggregation engine 56 can output such a data set.

With reference again to FIG. 3, computing device 50 can prepare reports for a particular customer. The reduced data set can then be sent to server 90, optionally through queue 80. Server 90 optionally is a web server that can interact with a customer over the Internet using known web server techniques and can be used to present the data of interest to the customer.

Server 90 optionally can use the improved user interface technique discussed below.

User Interface

Figure 5:
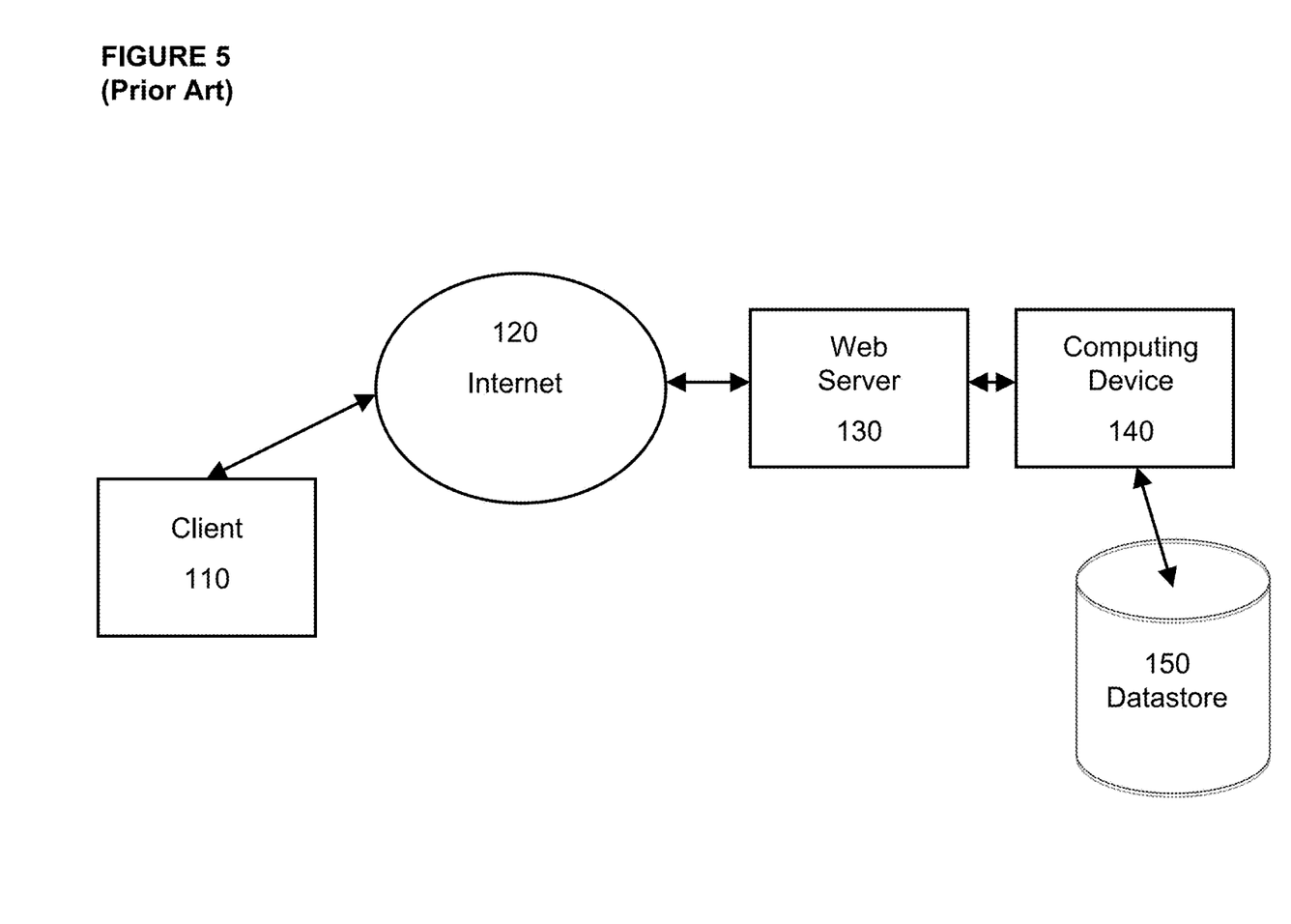
FIG. 5 is a block diagram of a prior art system for generating a web page.

With reference to FIG. 5, a typical prior art "backend" web server is depicted. Client computer 110 communicates with web server 130 over the Internet 120. Web server 130 generates and serves web pages to client computer 110 using known web page techniques, such as HTML and HTTP. Web server 130 optionally obtains data from computing device 140. Computing device 140 is coupled to data store 150. Datastore 150 optionally stores raw data in a relational database, such as MySQL. Computing device 140 accesses data in datastore 150. Web server 130 obtains data from computing device 140 and then displays that data using a variety of user interface techniques.

An embodiment is now described with reference to FIG. 6. A screen shot of an improved user interface 210 is shown. This user interface 210 can be generated by computing devices such as web server 130 and can be viewed on computing devices such as client computer 110. User interface 210 comprises menu bar 220 that in this example comprises the categories Geo, Product, Data Source, Organization, and Network. A user will select one of those categories through a click of the mouse or other known I/O techniques.

Figure 6:
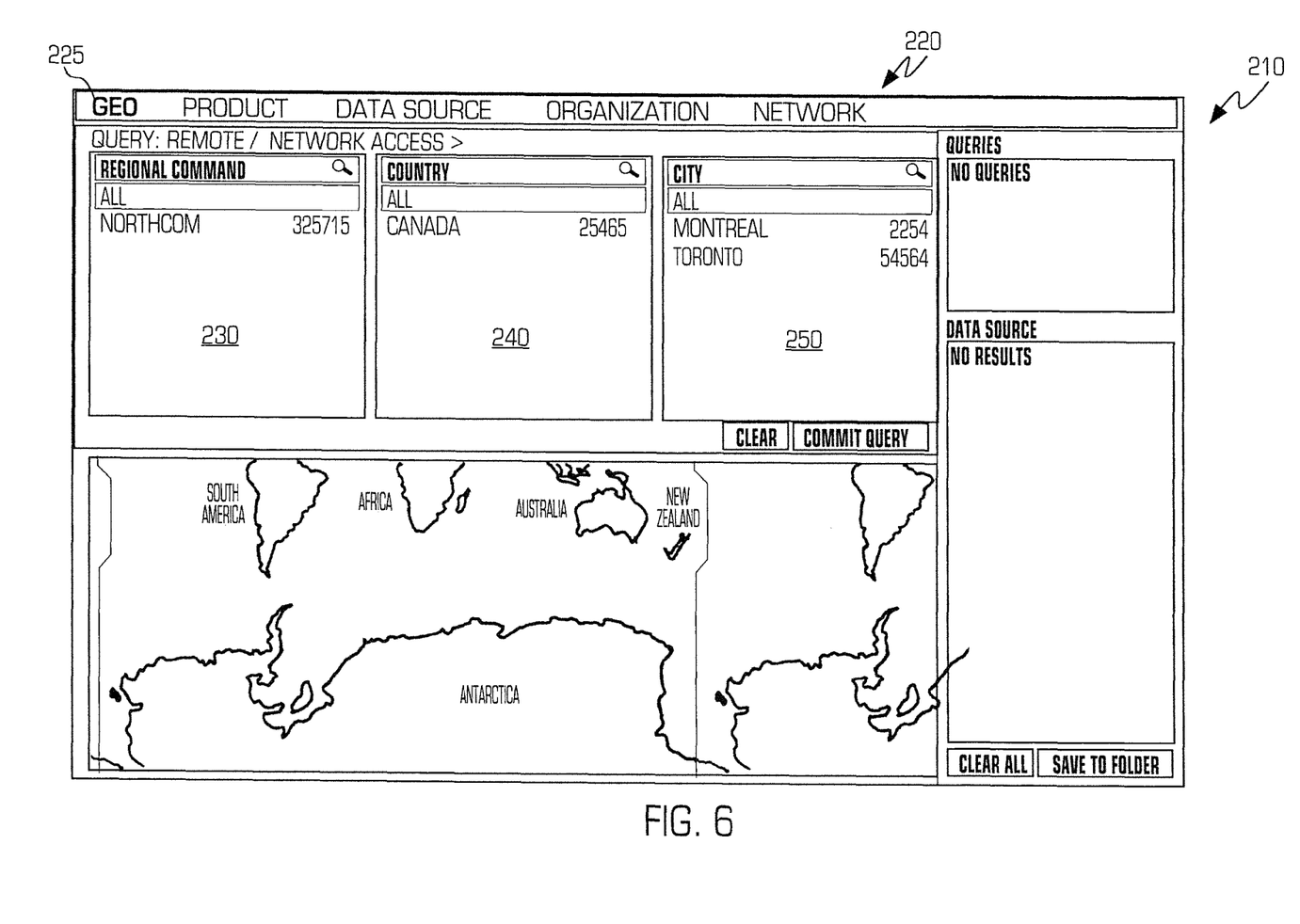
FIG. 6 is an exemplary screen shot of a user interface for a computing device.

In the example of FIG. 6, the Geo category 225 has been selected. User interface thereafter shows facet 230, facet 240, and facet 250. Here, facet 230 corresponds to Regional Command, facet 240 corresponds to Country, and facet 250 corresponds to City. Facet 230, facet 240, and facet 250 can be altered by the user using a menu or other known interface that allows the user to select a field to use for a facet, such as continent, language, hemispheres, etc. These fields typically will correspond to the fields of data stored in datastore 150.

In the example of FIG. 6, the facets themselves depict data that is generated in real-time. For example, facet 230 can show different regional commands, each of which is next to a number. That number can represent data of interest, such as number of IP addresses used, number of computers accessing the Internet, etc. The contents of facets 230, 240, and 250 are updated periodically. For example, they can be refreshed once every second.

Notably, the user can generate a query by clicking within any of facets 230, 240, and 250. For example, by clicking on the "NORTHCOM" item in facet 230, the countries displayed within facet 240 would change to display only the countries in NORTHCOM. However, a user also could select "Canada" within facet 240 from the outset. Facet 230 would then change to show "NORTHCOM" as selected, and facet 250 would update to display only cities within Canada.

In addition, as a new data item is added to datastore 150, the items within facets 230, 240, and 250 will change. For example, if a city in Canada is added to datastore 150, that city will be displayed in facet 250 when cities in Canada are being displayed. In this manner, facets 230, 240, and 250 are dynamic and are updated in real-time.

Figure 7:
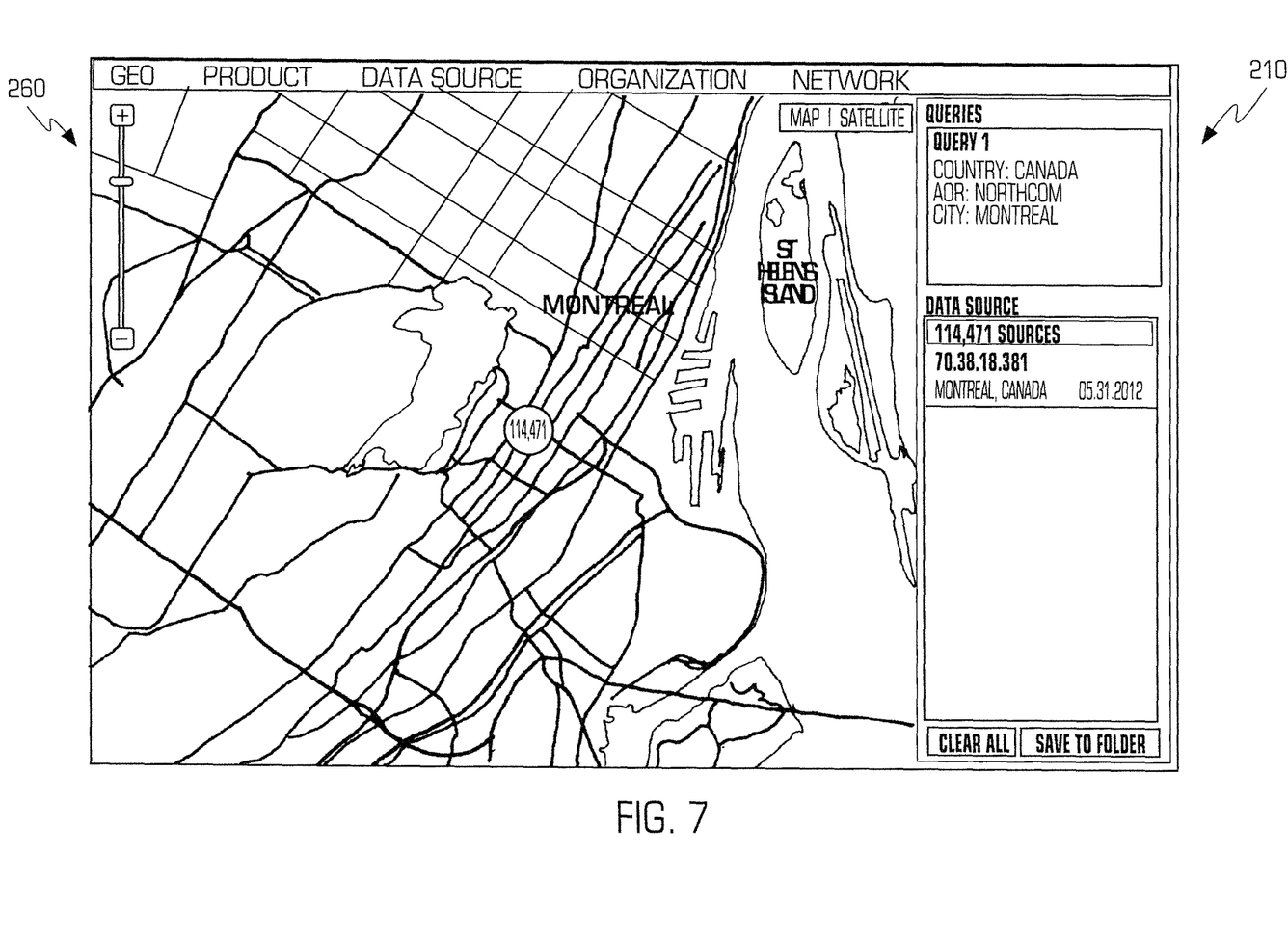
FIG. 7 is another exemplary screen shot of a user interface for a computing device.

With reference now to FIG. 7, another aspect of user interface 210 is shown. Here, three items from facets 230, 240, and 250 have been selected (in this example, URL, country, and application). The data is culled by computing device 140 and sent to web server 130, and the results are displayed graphically on interactive map 260. Interactive map 260 displays colored numbers for each result. If a user selects one of the colored numbers, additional data about that particular site is displayed.

Figure 8:
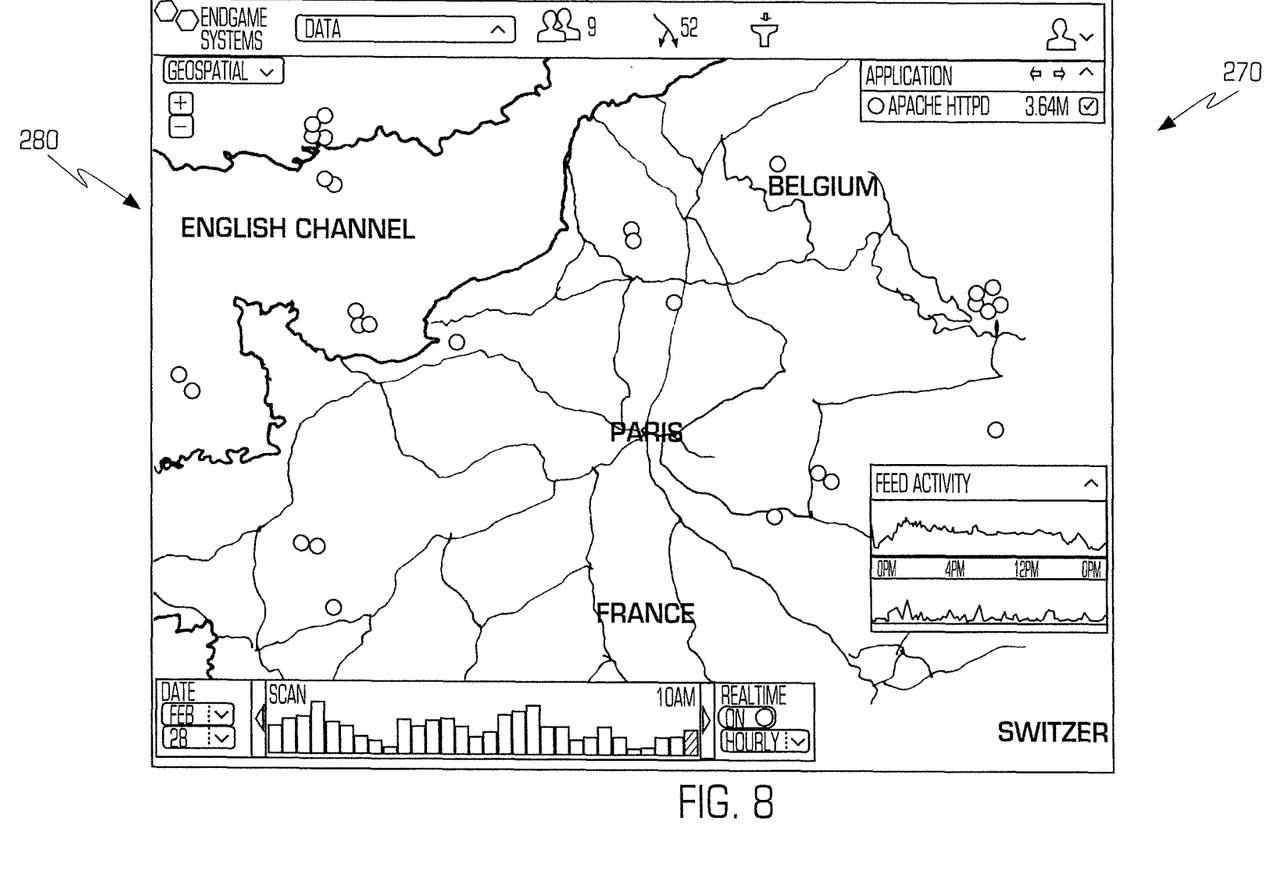
FIG. 8 is another exemplary screen shot of a user interface for a computing device

With reference to FIG. 8, another embodiment is shown. An exemplary screen shot of user interface 270 is shown. As with the embodiment of FIG. 7, user interface 270 includes an interactive map 280. However, interactive map 280 displays the data dynamically. In this example, the size of the colored circles varies depending on the magnitude of the data being measured. In this example, the number of hits to an IP address are being tracked. For each IP address, the number of hits are measured over a period of time $t_1$. The size of the circles displayed are directly proportional to the number of hits measured over time $t_1$ for that locale. This allows a user to watch interactive map 280 and quickly understand the change in usage patterns simply by watching the colored circles.

Figure 9:
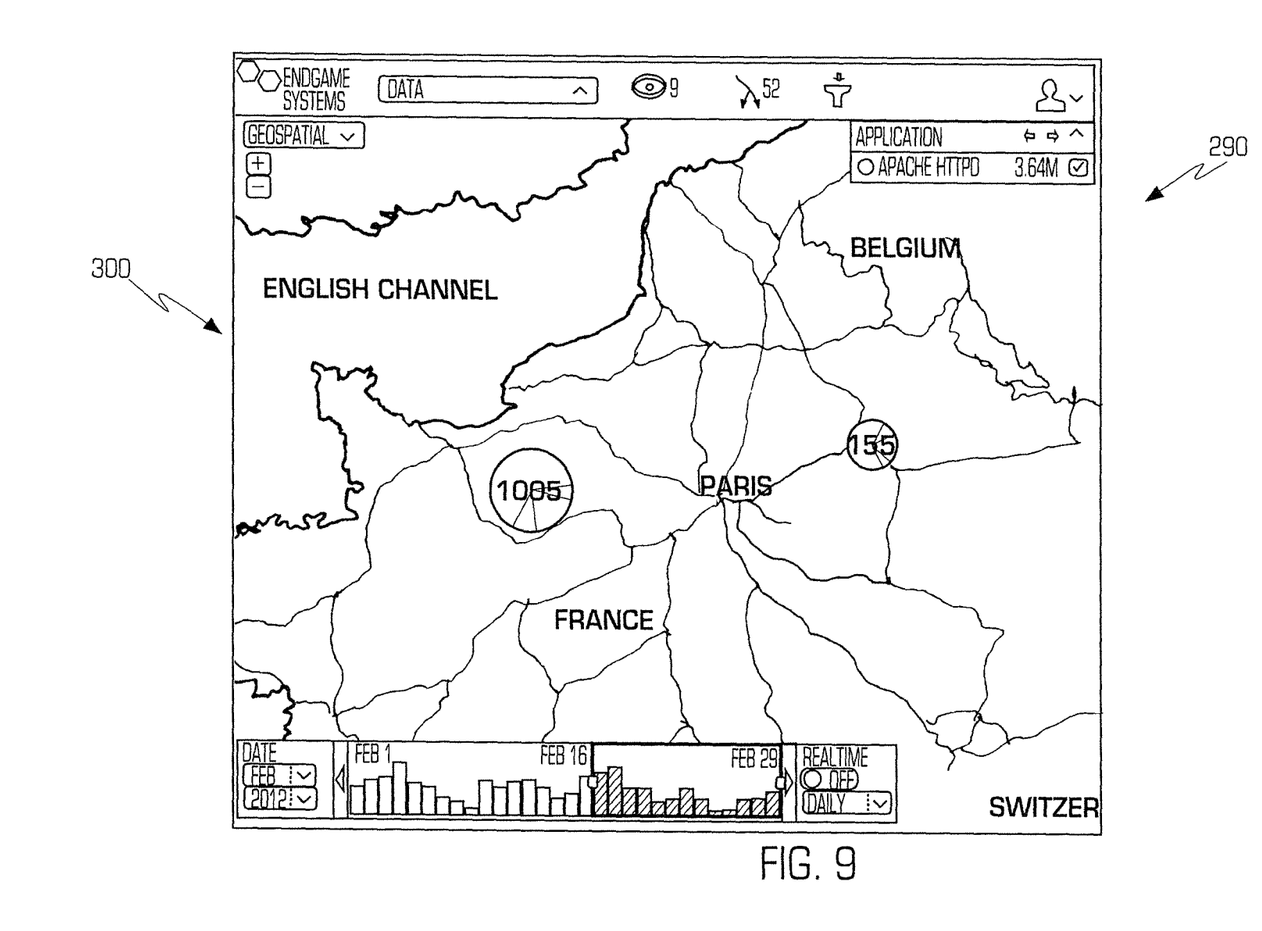
FIG. 9 is another exemplary screen shot of a user interface for a computing device.

An alternative embodiment is shown in FIG. 9. FIG. 9 depicts an exemplary screen shot of user interface 290. User interface 290 includes interactive map 300. Interactive map also includes the numerical value of the data of interest (such as number of devices with IP addresses), and each colored circle optionally includes a pie chart indicating other data of interest (such as type of web server used; e.g., "Apache").

References to the present invention herein are not intended to limit the scope of any claim or claim term, but instead merely make reference to one or more features that may be covered by one or more of the claims. Materials, processes and numerical examples described above are exemplary only, and should not be deemed to limit the claims. It should be noted that, as used herein, the terms "over" and "on" both inclusively include "directly on" (no intermediate materials, elements or space disposed there between) and "indirectly on" (intermediate materials, elements or space disposed there between). Likewise, the term "adjacent" includes "directly adjacent" (no intermediate materials, elements or space disposed there between) and "indirectly adjacent" (intermediate materials, elements or space disposed there between). For example, forming an element "over a substrate" can include forming the element directly on the substrate with no intermediate materials/elements there between, as well as forming the element indirectly on the substrate with one or more intermediate materials/elements there between.

What is claimed is:

1. A system for processing data received over a network, comprising:
 a plurality of sensors coupled to the Internet, wherein each sensor gathers data generated in response to domain name service (DNS) lookup events, wherein each DNS lookup event is an attempt by a device to access a website operated by a web server and the data comprises an IP address of the device and an IP address of the web server;
 a first computing device for receiving the data from the plurality of sensors to form a first set of data; and
 a storage device coupled to the first computing device for storing at least a portion of the first set of data;
 wherein the first computing device comprises a filtering engine for filtering the first set of data to create a second set of data based on one or more IP addresses contained in the first set of data, wherein the filtering engine is capable of filtering based on IP address, geographical location of web server, and frequency of DNS lookup of an IP address, and an aggregation engine for augmenting the second set of data by performing calculations on data comprising the second set of data to create a third set of data, wherein the calculations comprise determining the number of accesses to an IP address during a time period;
 wherein the first computing device is further configured to provide all or a portion of the third set of data to a client computer.

2. The system of claim 1, wherein the first set of data further comprises a timestamp generated during communication associated with a web session.

3. The system of claim 1, wherein the storage device is configured to update at least a portion of the first set of data and a portion of the second set of data.

4. The system of claim 3, wherein the third computing device is further configured to send updated data to the client computer in real-time.

5. The system of claim 1, wherein the third computing device is configured to send map data to the client computer indicating the geographic location of the first web server.

6. The system of claim 1, wherein the filtering engine is configured to filter based upon words contained in communication over the network.

7. A method for processing data received over a network, comprising:
 initiating, by a first computing device, a domain name service (DNS) lookup event by attempting to access a first website operated by a first web server;
 generating, by a first sensor, a first set of data comprising an IP address of the first computing device and an IP address of the first web server;
 initiating, by a second computing device, a DNS lookup event by attempting to access a second website operated by a second web server;
 generating, by a second sensor, a second set of data comprising an IP address of the second computing device and an IP address of the second web server;
 receiving, by a third computing device, an XML file comprising the first set of data and the second set of data over a network;
 storing, by a storage device coupled to the third computing device, at least a portion of the first set of data and a portion of the second set of data;
 filtering, by a filtering engine in the third computing device, the first set of data and the second set of data based upon criterion selected from a set comprising IP address, geographical location, and frequency of DNS lookup of an IP address to create a third set of data;
 augmenting, by an aggregation engine in the third computing device, the third set of data by performing calculations on data comprising the third set of data to create a fourth set of data, the calculations comprising determining a number of accesses to an IP address over a predetermined time interval; and
 providing, by the third computing device, all or a portion of the fourth set of data to a client computer.

8. The method of claim 7, wherein the network is the Internet.

9. The method of claim 7, wherein the first set of data comprises a first timestamp generated during communication between the first computing device and the first web server and the second set of data comprises a second timestamp generated during communication between the second computing device and the second web server.

10. The method of claim 9, wherein the first set of data further comprises one or more HTTP messages transmitted between the first computing device and the first web server and the second set of data comprises one or more HTTP messages transmitted between the second computing device and the second web server.

11. The method of claim 7 further comprising updating, by the storage device, at least a portion of the first set of data, and wherein the fourth set of data comprises a report indicating all accesses to the first web server by computing devices with an IP address associated with a local network within the network.

12. The method of claim 11 further comprising providing, by the third computing device, updated data to the client computer in real-time.

13. The method of claim 7 further comprising providing, by the third computing device, map data to the client computer that indicates the geographic location of one or more web servers.

14. The method of claim 7 wherein the filtering is based upon words contained in communication over the network.

15. The method of claim 7 wherein the filtering is based upon the geographic location of one or more web servers.

* * * * *